(12) United States Patent
Beyer et al.

(10) Patent No.: US 6,796,534 B2
(45) Date of Patent: Sep. 28, 2004

(54) METHOD AND APPARATUS FOR CONTROLLING AIRFLOW WITH A LEADING EDGE DEVICE HAVING A FLEXIBLE FLOW SURFACE

(75) Inventors: Kevin W. Beyer, Seattle, WA (US); Stephen J. Fox, Everett, WA (US); Douglas S. Lacy, Bothell, WA (US); Seiya Sakurai, Seattle, WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 10/238,130

(22) Filed: Sep. 10, 2002

(65) Prior Publication Data

US 2004/0046087 A1 Mar. 11, 2004

(51) Int. Cl.⁷ ................................................. B64C 3/50
(52) U.S. Cl. ........................................ 244/214; 244/219
(58) Field of Search ............................... 244/213, 214, 244/215, 216, 219, 75 R

(56) References Cited

U.S. PATENT DOCUMENTS

| | | |
|---|---|---|
| 1,770,575 A | 7/1930 | Ksoll |
| 2,891,740 A | 6/1959 | Campbell |
| 3,447,763 A | 6/1969 | Allcock |

(List continued on next page.)

FOREIGN PATENT DOCUMENTS

| | | |
|---|---|---|
| EP | 0 103 038 | 3/1984 |

OTHER PUBLICATIONS

U.S. patent application Ser. No. 09/714,026, Sakurai, filed Nov. 16, 2000.
U.S. patent application Ser. No. 09/921,212, Farnsworth, filed Aug. 2, 2001.
U.S. patent application Ser. No. 10/188,988, Beyer et al., filed Jul. 2, 2002.
Drela, Mark, "Design and Optimization Method for Mutli–Element Airfoils," MIT Department of Aeronautics and Astronautics, Copyright 1993 American Institute of Aeronautics and Astronautics, Inc. (pp. 1–11).
European Search Report for European Patent Application No. EP 03 07 7840, The Boeing Company, Nov. 4, 2003 (2 pages).

*Primary Examiner*—Galen Barefoot
(74) *Attorney, Agent, or Firm*—Perkins Coie LLP

(57) ABSTRACT

Methods and apparatuses for controlling airflow with a leading edge device having a flexible flow surface. In one embodiment, the airfoil includes a first portion having a first flow surface and a second flow surface facing opposite from the first flow surface. The second portion of the airfoil has a leading edge and is movably coupled to the first position. The second portion can move between a first position and a second position offset from the first position by an angle of from about 45° to about 90° or more. The second portion includes a flexible flow surface having a first shape when the second portion is in the first position and a second shape different than the first shape when the second portion is in the second position. A guide structure can be coupled between the first portion and the second portion. In another embodiment, the airfoil can have inbound and outbound leading edge portions with an inbound guide structure having a first mechanical arrangement and an outbound guide structure having a second mechanical arrangement different than the first.

52 Claims, 5 Drawing Sheets

U.S. PATENT DOCUMENTS

| | | | |
|---|---|---|---|
| 3,504,870 | A | 4/1970 | Cole et al. |
| 3,556,439 | A | 1/1971 | Autry et al. |
| 3,704,828 | A * | 12/1972 | Studer et al. .......... 239/265.19 |
| 3,743,219 | A | 7/1973 | Gorges |
| 3,831,886 | A * | 8/1974 | Burdges et al. ............. 244/214 |
| 3,836,099 | A * | 9/1974 | O'neill et al. .............. 244/219 |
| 3,910,530 | A | 10/1975 | James et al. |
| 3,941,334 | A | 3/1976 | Cole |
| 3,994,451 | A | 11/1976 | Cole |
| 4,117,996 | A | 10/1978 | Sherman |
| 4,131,253 | A | 12/1978 | Zapel |
| 4,171,787 | A | 10/1979 | Zapel |
| 4,189,120 | A | 2/1980 | Wang |
| 4,189,121 | A | 2/1980 | Harper et al. |
| 4,200,253 | A * | 4/1980 | Rowarth ..................... 244/214 |
| 4,262,868 | A | 4/1981 | Dean |
| 4,293,110 | A | 10/1981 | Middleton et al. |
| 4,312,486 | A | 1/1982 | McKinney |
| 4,351,502 | A | 9/1982 | Statkus |
| 4,427,168 | A | 1/1984 | McKinney et al. |
| 4,475,702 | A | 10/1984 | Cole |
| 4,700,911 | A | 10/1987 | Zimmer |
| 4,706,913 | A | 11/1987 | Cole |
| 4,784,355 | A | 11/1988 | Brine |
| 4,856,735 | A | 8/1989 | Lotz, deceased et al. |
| 5,094,412 | A * | 3/1992 | Narramore ................... 244/214 |
| 5,158,252 | A | 10/1992 | Sakurai |
| 5,167,383 | A | 12/1992 | Nozaki |
| 5,474,265 | A | 12/1995 | Capbern et al. |
| 5,544,847 | A | 8/1996 | Bliesner |
| 6,293,497 | B1 | 9/2001 | Kelley-Wickemeyer et al. |
| 2002/0100842 | A1 | 8/2002 | Perez |

* cited by examiner

METHOD AND APPARATUS FOR CONTROLLING AIRFLOW WITH A LEADING EDGE DEVICE HAVING A FLEXIBLE FLOW SURFACE

CROSS-REFERENCE TO RELATED APPLICATION

The present application is related to pending U.S. patent application 10/188,988, filed Jul. 2, 2002 and incorporated herein in its entirety by reference.

TECHNICAL FIELD

The present application is directed toward methods and apparatuses for controlling the airflow around an airfoil having a leading edge device with a flexible flow surface.

BACKGROUND

Modern high speed, subsonic commercial aircraft typically have wings with a variety of leading edge and trailing edge devices to change the shape of the airfoil as the flight conditions change. Such airfoils can include flexible panels at the airfoil leading edge, as disclosed in U.S. Pat. Nos. 3,994,451; 4,171,787; 4,351,502; 4,475,702; and 4,706,913. Other airfoils include flexible trailing edge panels, such as those disclosed in U.S. Pat. Nos. 4,131,253 and 4,312,486. Other existing devices include variable camber, leading edge Krueger-type flaps, such as those disclosed in U.S. Pat. Nos. 3,504,870; 3,556,439; 3,743,219; 3,910,530; 3,941,341; 4,189,120, 4,189,122; 4,262,868; 4,427,168; 5,158,252; and 5,474,265.

One potential drawback with some of the foregoing devices is that it may be difficult to arrange the devices to move to very high deflection angles and still stow cleanly for level flight. Accordingly, many of the foregoing devices represent a compromise between a desirable high deflection angle at landing and other low speed conditions, and a clean configuration when the devices are stowed. Another potential drawback with some of the foregoing devices is that they may be difficult to integrate with very thin airfoils and/or very thin portions of airfoils. Accordingly, it may be difficult to integrate these devices into high speed airfoils, which typically have a low thickness-to-chord ratio. Furthermore, it may be difficult to integrate these devices with the thin outboard sections of lower speed airfoils.

SUMMARY

The present invention is directed toward methods and apparatuses for controlling airflow with a leading edge device having a flexible flow surface. An airfoil in accordance with one aspect of the invention includes a first portion having a first flow surface and a second flow surface facing opposite from the first flow surface. A second portion of the airfoil has a leading edge, with at least a part of the second portion being positioned forward of the first portion. The second portion is movable relative to the first portion between a first position and a second position, with the second position offset from the first position by an angle of about 45° or more. The second portion can include a flexible flow surface having a first shape when the second portion is in the first position and a second shape different than the first shape when the second portion is in the second position. A guide structure can be coupled between the first portion and the second portion, for example, to guide the motion of the second portion of the airfoil.

In a further aspect of the invention, the second portion can include a leading edge body and a third flow surface opposite the flexible flow surface. The guide structure can include a crank pivotably coupled to the first portion, a link body pivotably coupled between the crank and the leading edge body, and a first link pivotably coupled between the first portion and the link body. The guide structure can further include a second link pivotably coupled between the crank and the flexible flow surface, a third link pivotably coupled between the crank and the third flow surface, a fourth think pivotably coupled between the link body and the leading edge body, and a fifth link pivotably coupled between the link body and the leading edge body. In another aspect of the invention, the guide structure can include a crank pivotably coupled to the first portion, a slider pivotably coupled to the crank and slidably engaged with the leading edge body, a first link pivotably coupled between the first portion and the slider, a second link pivotably coupled between the crank and the flexible flow surface, and a third link pivotably coupled between the crank and the third flow surface.

An airfoil in accordance with another aspect of the invention can include a first portion, a second portion movably coupled to the first portion and having an inboard leading edge, an inboard flexible flow surface, and an inboard guide structure having an inboard mechanical arrangement. A third portion can be movably coupled to the first portion and can have an outboard leading edge, an outboard flexible flow surface, and an outboard guide structure having an outboard mechanical arrangement different than the inboard mechanical arrangement.

A method for operating an aircraft airfoil having a first portion and a second portion movably coupled to the first portion in accordance with one embodiment of the invention includes moving the second portion relative to the first portion from a first position to a second position, with at least part of the second portion being positioned forward of the first portion and deflected through at least 45°. The method can further include changing a shape of a flexible flow surface of the second portion as the second portion moves from the first position to the second position.

A method in accordance with another aspect of the invention includes moving the second portion of the airfoil relative to the first portion by actuating a first guide structure having a first mechanical arrangement, and moving a third portion outboard of the second portion relative to the first portion by actuating a second guide structure having a second mechanical arrangement different than the first mechanical arrangement.

DETAILED DESCRIPTION

The present disclosure describes airfoils having leading edge devices with flexible flow surfaces, and method for operating such airfoils. Many specific details of certain embodiments of the invention are set forth in the following description and in FIGS. 1–7 to provide a thorough understanding of these embodiments. One skilled in the art, however, will understand that the present invention may have additional embodiments, and that the invention may be practiced without several of the details described below.

Figure 1:
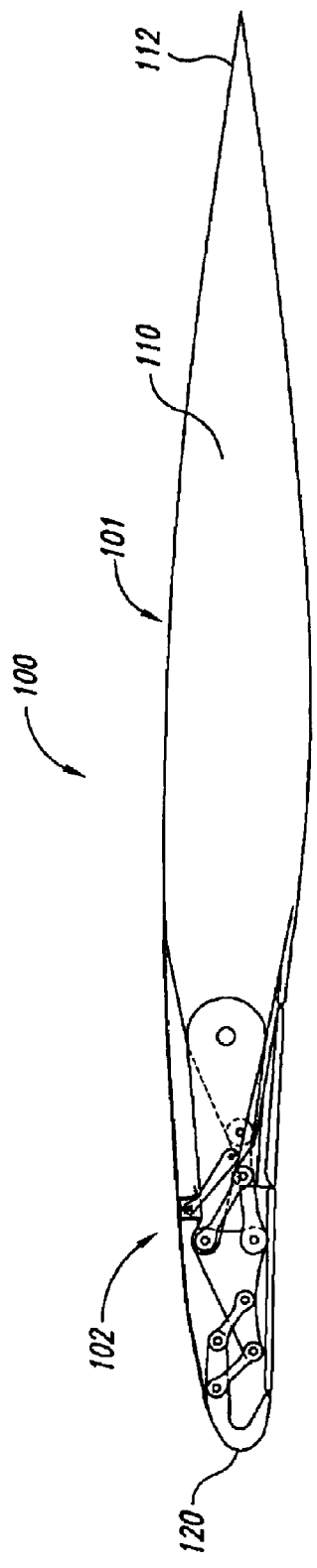
FIG. 1 is a partially schematic, cross-sectional side view of an airfoil having a movable leading edge portion with a flexible flow surface in accordance with an embodiment of the invention.

FIG. 1 is a partially schematic, cross-sectional side view of an airfoil 100 having a first, fixed portion 101 and a second, movable portion 102 that moves relative to the first portion 101 in accordance with an embodiment of the invention. In one aspect of this embodiment, the first portion 101 can include a wing body 110 having a trailing edge 112. The second portion 102 can include a leading edge body 120 coupled to the wing body 110 and extending forwardly from the wing body 110. The second portion 102 can move relative to the first portion 101 from a neutral position (shown in FIG. 1) to a variety of deployed positions, as described in greater detail below with reference to FIGS. 2–3C.

Figure 2:
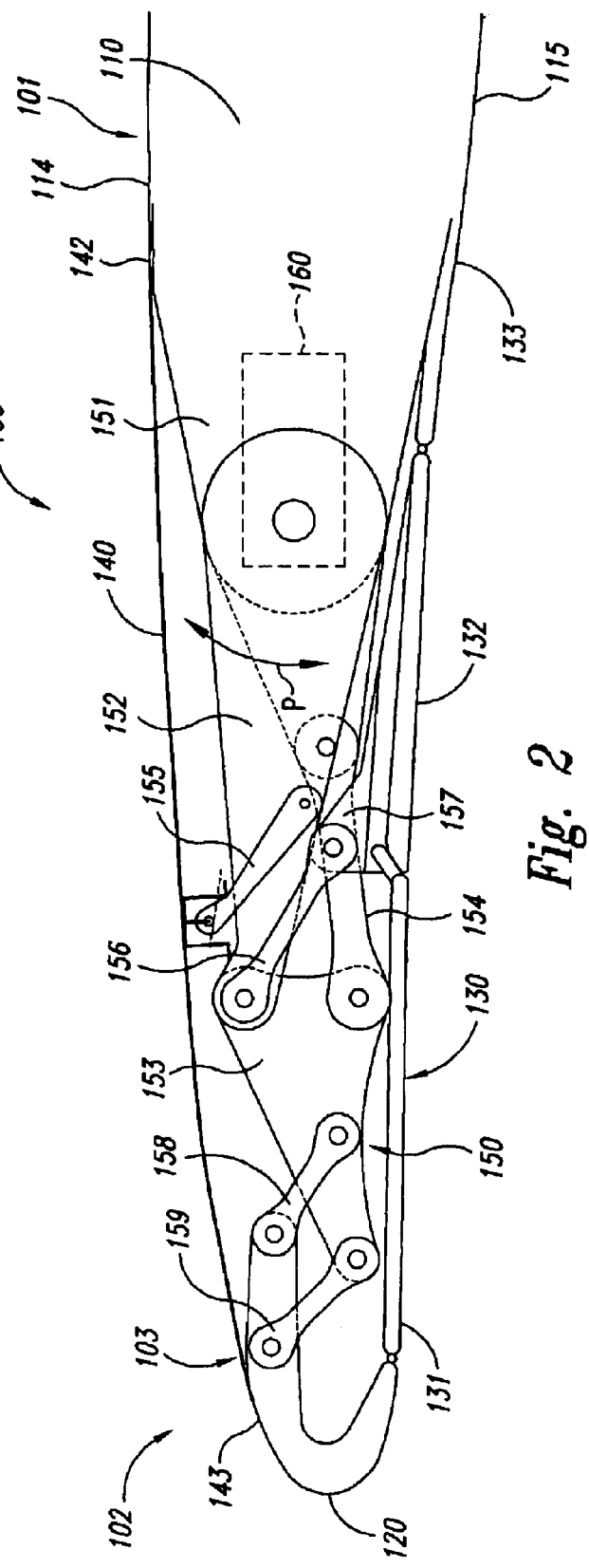
FIG. 2 is an enlarged, partially schematic illustration of a forward portion of an embodiment of the airfoil shown in FIG. 1.

FIG. 2 is an enlarged view of the forward portion of the airfoil 100 described above with reference to FIG. 1. As shown in FIG. 2, the first portion 101 can have a first or upper flow surface 114 and a second or lower flow surface 115 facing opposite from the first flow surface 114. The second portion 102 of the airfoil 100 can include an upper surface 103 and a lower surface 130 facing opposite from the upper surface 103. When the second portion 102 is in the neutral position (as shown in FIG. 2), the second portion 102 can be at least partially sealed against the first portion 101, with the upper surface 103 and the first flow surface 114 forming a generally continuous upper contour, and the lower surface 130 and the second flow surface 115 forming a generally continuous lower contour.

In one aspect of an embodiment shown in FIG. 2, the second portion 102 can be coupled to the first portion 101 with a guide structure 150. In a further aspect of this embodiment, the guide structure 150 can include a series of cranks and links that form a multiple-bar linkage. In other embodiments, the guide structure 150 can have other arrangements, such as a slider arrangement (described in greater detail below with reference to FIGS. 5 and 6). In any of these embodiments, the guide structure 150 can guide the motion of the second portion 102 as it moves relative to the first portion 101.

In one embodiment, the first portion 101 can include a support 151 extending forwardly toward the second portion 102. The guide structure 150 can include a crank 152 pivotably coupled to the support 151 and coupled to an actuator 160 for rotation relative to the wing body 110, as indicated by arrow P. As the crank 152 rotates clockwise or counter-clockwise, it drives the leading edge body 120 upwardly or downwardly, respectively, through a series of links. Accordingly, the crank 152 can be pivotably coupled to a link plate 153. The link plate 153 can be pivotably coupled to the support 151 with a first link 154. A second link 155 can pivotably couple the crank 152 to the upper surface 103. A third link 156 can be pivotably coupled between the link plate 153 and a third link support 157 attached to the lower surface 130. A fourth link 158 and a fifth link 159 can pivotably couple the link plate 153 to the leading edge body 120.

In one aspect of this embodiment, the upper surface 103 can include a flexible flow surface 140 that extends from an aft attachment point 142 on the wing body 110 to a forward attachment point 143 on the leading edge body 120. Accordingly, the flexible flow surface 140 can change shape as the second portion 102 pivots upwardly or downwardly relative to the first portion 101. In one embodiment, the flexible flow surface 140 can include a metal sheet, such as an aluminum sheet or a titanium sheet. In another embodiment, the flexible flow surface 140 can include a composite material, such as a carbon fiber material. In still further embodiments, the flexible flow surface 140 can include other pliable materials that can withstand the aerodynamic loads encountered during flight.

The lower surface 130 (opposite the flexible flow surface 140) can also change shape as the second portion 102 pivots relative to the first portion 101. In one embodiment, the lower surface 130 can include a forward segment 131, an intermediate segment 132 aft of the forward segment 131, and an aft segment 133 connected to the second flow surface 115 of the first portion 101. The forward segment 131 can be pivotably coupled to the leading edge body 120, and the intermediate segment 132 can be pivotably coupled to the aft segment 133. The forward segment 131 and the intermediate segment 132 can slide relative to each other when the second portion 102 deflects downwardly, as described in greater detail below with reference to FIGS. 3A–3B. In other embodiments, the lower surface 130 can have other arrangements that change shape to accommodate the motion of the second portion 102.

Figure 3A:
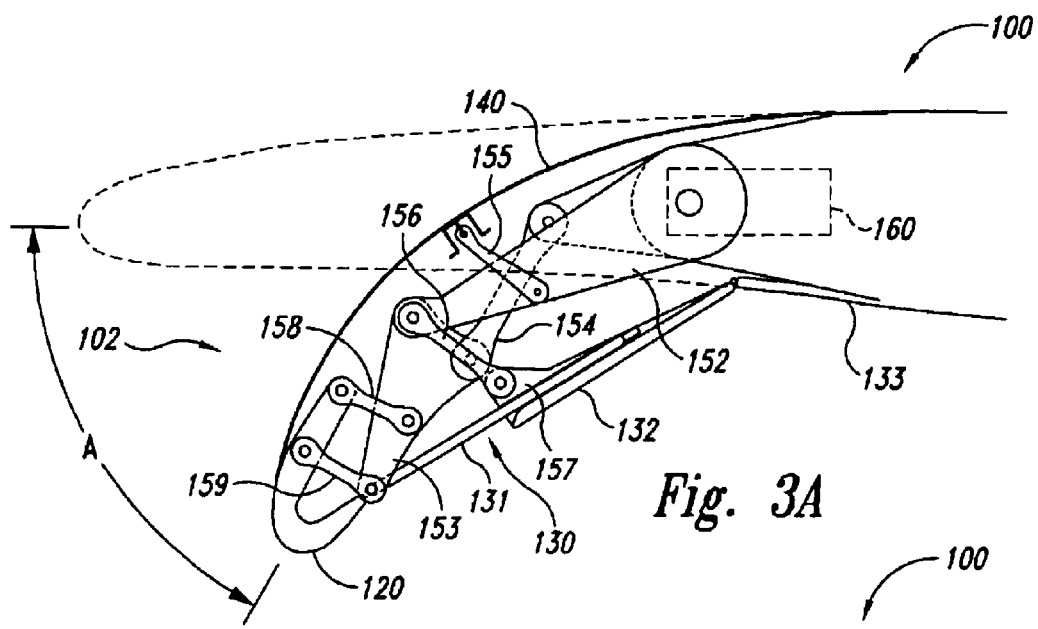
FIGS. 3A–3C illustrate an airfoil having a movable leading edge device deployed in accordance with embodiments of the invention.

FIG. 3A is a partially schematic, cross-sectional side view of the airfoil 100 with the second portion 102 deflected downwardly through an angle A of about 45° relative to the neutral position shown in FIGS. 1 and 2. As shown in FIG. 3A, the second portion 102 is deflected downwardly by rotating the crank 152 downwardly. As the crank 152 rotates, the second link 155 and the leading edge body 120 increase the curvature of the flexible flow surface 140. The link plate 153, along with the fourth link 158 and the fifth link 159 control the motion of the leading edge body 120 as the crank 152 rotates. The third link 156 controls the motion of the intermediate segment 132 as the crank 152 rotates. As the leading edge body 120 rotates downwardly, the forward segment 131 of the lower surface 130 slides over the intermediate segment 132 to shorten the overall length of the lower surface 130.

Figure 3B:
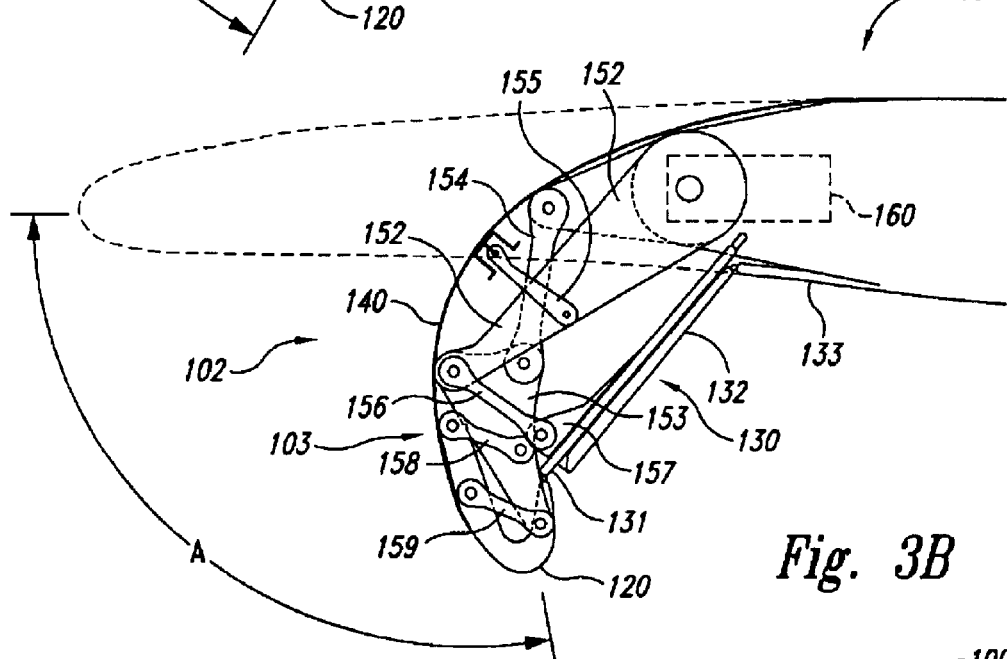

The second portion 102 can be further deployed to additional downwardly deflected positions. For example, as shown in FIG. 3B, the second portion 102 can be deployed to a downward position through an angle A that is at least 90° or more. Even as the second portion 102 deflects through such large angles, the upper surface 103 of the second portion 102 remains continuous, as the flexible flow surface 140 changes shape. The lower surface 130 can also remain continuous, as a result of the sliding action of the forward segment 131 relative to the intermediate segment 132.

Figure 3C:
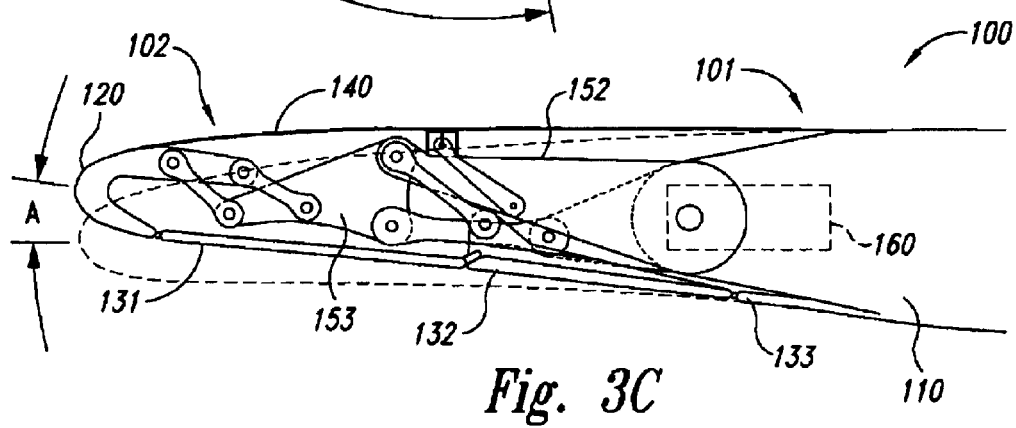

In one embodiment, the second portion 102 can also be deployed upwardly from the neutral position, as shown in FIG. 3C. In one aspect of this embodiment, the second portion can be deflected upwardly by between about 5° and about 10° or more, relative to the first portion 101. In other embodiments, the second portion 102 can deflect upwardly by other amounts.

One feature of the foregoing embodiments of the airfoil 100 described with respect to FIGS. 1–3C is that the leading edge body 120 can deflect through relatively large angles while maintaining a smooth contour along upper surface (defined by surface portions 103 and 114) and the lower surface (defined by surface portions 130 and 115). Accordingly, the airfoil 100 can be operated at high angles of attack without creating large bubbles of separated flow near the leading edge.

Another feature of embodiments of the airfoil 100 described above with reference to FIGS. 1–3C is that the guide structure 150 for moving the second portion 102 relative to the first portion 101 can be compact. Accordingly, the guide structure 150 can fit within an airfoil 100 having a thin profile. An advantage of both the foregoing features is that an arrangement of the airfoil 100 can be particularly suitable for high speed aircraft. Such aircraft typically have thin wings (e.g., wings with low thickness-to-chord or t/c ratios) for efficient high speed cruise, and typically fly at high angles of attack during low speed operation. For example, these arrangements may be particularly suitable for high subsonic or near-sonic configurations, as described in greater detail below with reference to FIG. 7. In other embodiments, these arrangements may be applied to other high speed aircraft, such as supersonic aircraft. In one particular embodiment, the overall airfoil 100 can have a t/c ratio of about 0.1 and the second portion 102 can have a thickness-to-length ratio (with length measured from the airfoil leading edge to the aft attachment point 142) of about 0.25. In other embodiments, these ratios can have other values.

Figure 4:
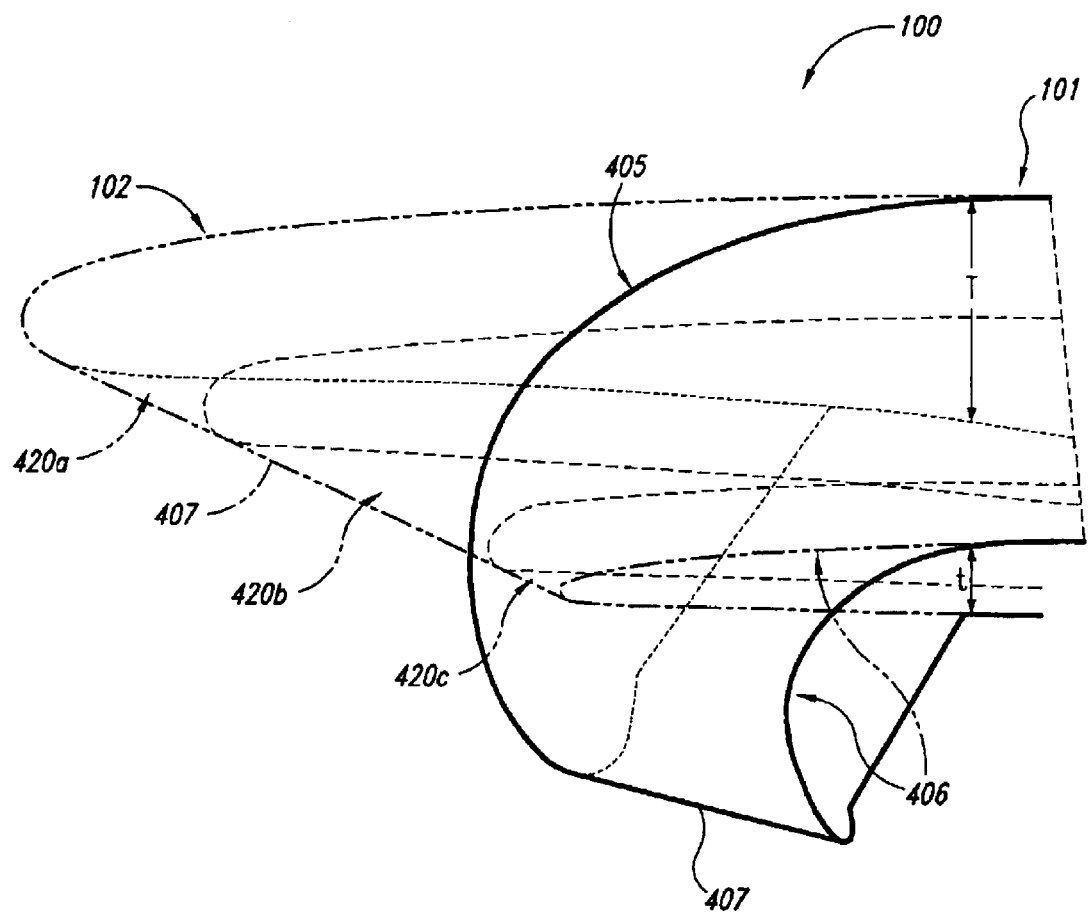
FIG. 4 is a schematic illustration of an airfoil having a leading edge with inboard and outboard portions that deflect in accordance with another embodiment of the invention.
Figure 7:
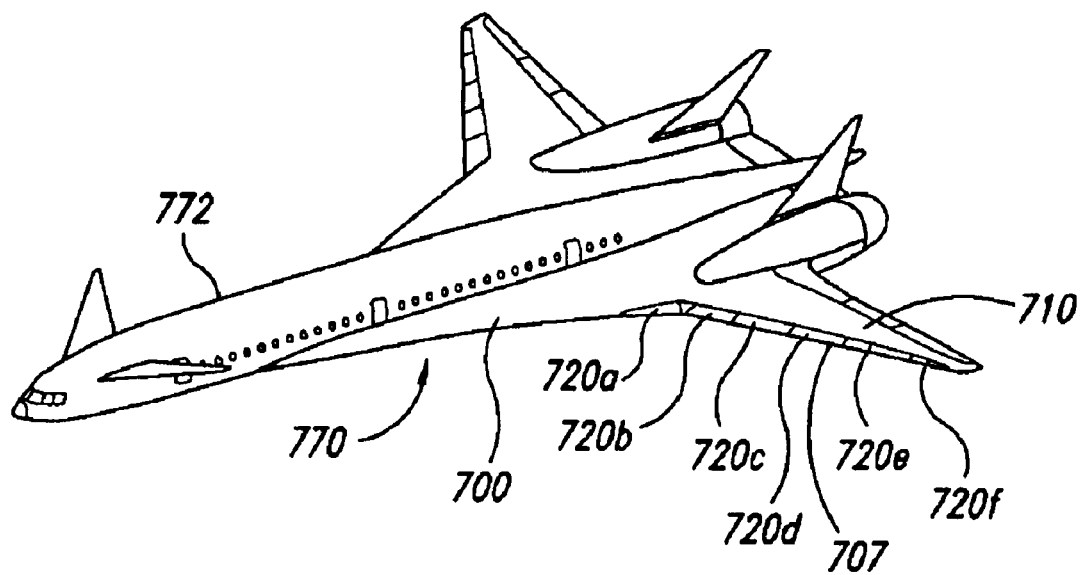
FIG. 7 is an isometric view of an aircraft having a wing having leading edge devices installed in accordance with an embodiment of the invention.

FIG. 4 is a partially schematic, isometric view of an embodiment of the airfoil 100 having a fixed first portion 101 and a movable second portion 102, shown in a neutral position (in phantom lines) and a deployed position (in solid lines). The second portion 102 includes inboard portion 405, an outboard portion 406 and a leading edge 407 extending between the inboard portion 405 and the outboard portion 406. As shown in FIG. 7, the outboard thickness t of the airfoil 100 can substantially smaller than the inboard thickness T of the same airfoil 100. In one embodiment, the airfoil 100 can include multiple adjacent leading edge bodies (three of which are shown in FIG. 4 as leading edge bodies 420a, 420b, and 420c) that extend in a spanwise direction from the inboard portion 405 to the outboard portion 406. In one aspect of this embodiment, each leading edge body 420a–420c can include a guide structure 150 (not visible in FIG. 4) that is generally similar in design to the guide structure 150 described above, and is mechanically similar to the guide structure of the neighboring segment. Because the guide structure 150 described above with reference to FIGS. 2–3C is relatively compact, the same type of guide structure 150 can be coupled to each of the leading edge bodies 420a–420c. In a further aspect of this embodiment, the guide structure 150 coupled to the outboardmost leading edge body 420c can be mechanically similar to but scaled down from the guide structure 150 coupled to the inboardmost leading edge body 420a.

Figure 5:
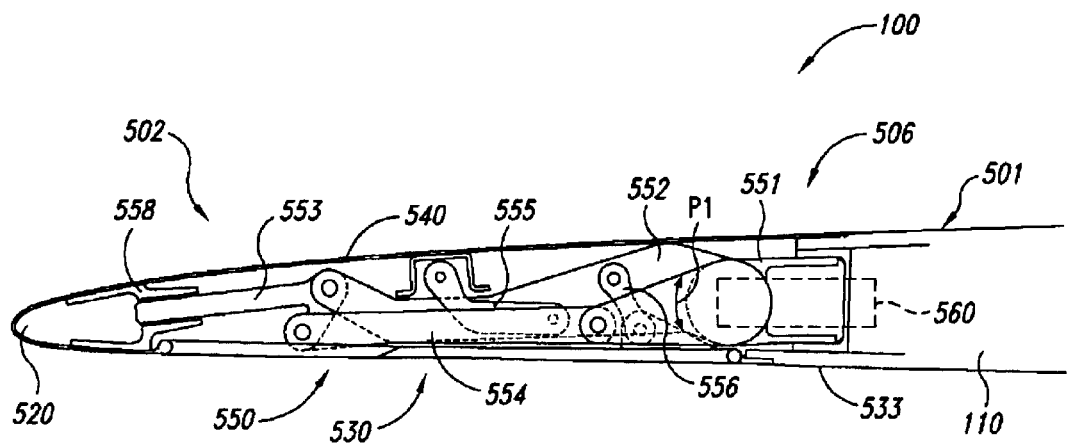
FIG. 5 is a partially schematic, cross-sectional side view of an airfoil having a movable leading edge portion arranged in accordance with another embodiment of the invention.

In other embodiments, the outboard portions of the airfoil 100 can have outboard leading edge bodies coupled to guide structures that are different than those coupled to the inboard leading edge bodies. For example, as shown in FIG. 5, an outboard portion 506 of the airfoil 100 can include a first portion 501 and a second portion 502 that is movable relative to the first portion 501. In one particular embodiment, the second portion 502 can have a thickness-to-length ratio of about 0.16, and in other embodiments, this ratio can have other values. In any of those embodiments, the second portion 502 can include a leading edge body 520 coupled to the first portion 501 with a guide structure 550 having an arrangement in accordance with another embodiment of the invention. In one aspect of this embodiment, the first portion 501 can include a support 551, and the guide structure 550 can include a crank 552 pivotably coupled to the support 551. An actuator 560 can rotate the crank 552 clockwise or counterclockwise, as indicated by arrow P1. The crank 552 can be coupled to a slider 553 which is received in a slider guide 558 of the leading edge body 520. The guide structure 550 can further include a first link 554 coupled between the slider 553 and the support 551, a second link 555 pivotably coupled between a flexible flow surface 540 and the crank 552, and a third link 556 pivotably coupled between the crank 552 and a lower surface 530 of the second portion 502.

Figure 6:
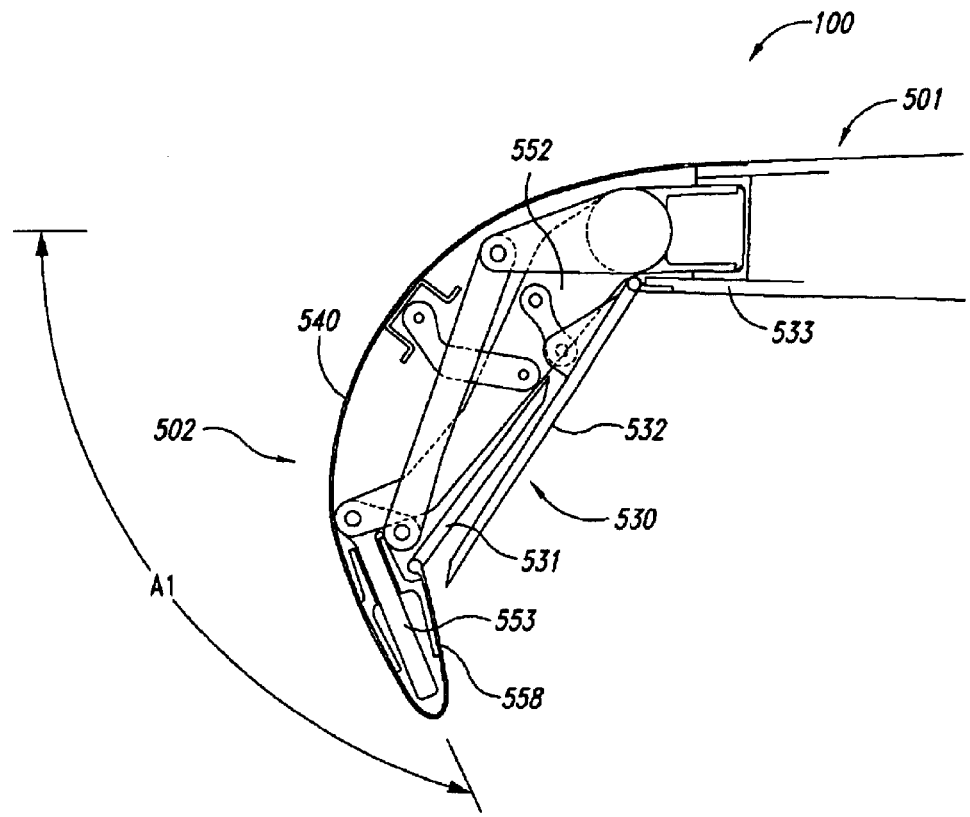
FIG. 6 illustrates the airfoil shown in FIG. 5 deployed to a deflected position in accordance with an embodiment of the invention.

As shown in FIG. 6, the second portion 502 can be deflected downwardly through angle A1 by rotating the crank 552 clockwise. As the crank 552 rotates, the slider 553 is slidably received in the slider guide 558, allowing the flexible flow surface 540 to curve as shown in FIG. 6. The lower surface 530 can shorten in a manner generally similar to that described above with reference to FIG. 3A, and can accordingly include a forward segment 531 that slides relative to an intermediate segment 532, which is pivotably coupled to an aft segment 533. Accordingly, the second portion 502 can deflect through angles A1 of 90° or more while maintaining smooth airflow contours when in the undeployed position, the fully deployed position, and intermediate positions.

In one embodiment, a single airfoil 100 (such as that shown in FIG. 4) can include a first guide structure (such as the guide structure 150) having a first mechanical arrangement and positioned at the inboard portion 405, and a second guide structure (such as the guide structure 550) having a second mechanical arrangement different than the first mechanical arrangement and positioned at the outboard portion 406. For example, the more compact guide structure can be positioned in the outboard portion 406 and the less compact structure can be positioned in the inboard portion 405. In another embodiment, multiple guide structures of a single design can be coupled to the multiple leading edge bodies of the airfoil 100. For example, when the airfoil 100 is relatively thick, multiple guide structures 150 of the type described above with reference to FIGS. 2–3C can be provided across the span of the airfoil 100. When the entire airfoil 100 is relatively thin, multiple guide structures 550 of the type described above with reference to FIGS. 5 and 6 can be deployed across the span of the airflow 100. In other embodiments, the airfoil 100 can include guide structures having arrangements other than those described above with reference to FIGS. 1–6.

FIG. 7 is a partially schematic, isometric illustration of an aircraft 770 that includes a fuselage 772 and a wing 700 having leading edge devices in accordance with an embodiment of the invention. In one aspect of this embodiment, the wing 700 can include a leading edge 707 and multiple leading edge bodies 720 (shown in FIG. 7 as leading edge bodies 720a–720f). Each leading edge body 720 can be coupled to a wing body portion 710 of the airfoil 700 with a guide structure generally similar to any of those described above with reference to FIGS. 1–6. For example, in one aspect of this embodiment, the inboard leading edge bodies (such as leading edge bodies 720a–720d) can include a guide structure 150 generally similar to that described above with reference to FIGS. 2–3C. The outboard leading edge body (such as leading edge bodies 720e–720f) can include guide structures 550 such as those described above with reference to FIGS. 5 and 6. In other embodiments, the airfoil 700 can include other guide structures and/or other combinations of guide structures. In any of these embodiments, the wing 700 can be configured for subsonic, near sonic or supersonic flight.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. An aircraft, comprising:

a fuselage;

an airfoil depending from the fuselage, the airfoil including:

a first portion having a first flow surface and a second flow surface facing opposite from the first flow surface;

a second portion having a leading edge, at least part of the second portion being positioned forward of the first portion, the second portion being movable relative to the first portion between a first position and a second position with the second position offset from the first position and deflected angularly downwardly from the first position by an angle of about 45 degrees or more, wherein the second portion is movable relative to the first portion between the first position and a third position deflected angularly upwardly from the first position, and wherein the second portion includes a flexible flow surface, the flexible flow surface having a first shape when the second portion is in the first position, the flexible flow surface having a second shape different than the first shape when the second portion is in the second position; and a guide structure coupled between the first portion and the second portion.

2. An airfoil comprising:

a first portion having a first flow surface and a second flow surface facing opposite from the first flow surface;

a second portion having a leading edge, at least part of the second portion being positioned forward of the first portion, the second portion being movable relative to the first portion between a first position and a second position with the second position offset from the first position by an angle of about 90 degrees or more, wherein the second portion includes a flexible flow surface, the flexible flow surface having a first shape when the second portion is in the first position, the flexible flow surface having a second shape different than the first shape when the second portion is in the second position; and a guide structure coupled between the first portion and the second portion.

3. An airfoil, comprising:

a first portion having a first flow surface and a second flow surface facing opposite from the first flow surface;

a second portion having a leading edge, at least part of the second portion being positioned forward of the first portion, the second portion being movable relative to the first portion between a first position and a second position with the second position offset from the first position and deflected angularly downwardly from the first position by an angle of about 45 degrees or more, wherein the second portion is movable relative to the first portion between the first position and a third position deflected angularly upwardly from the first position and wherein the second portion includes a flexible flow surface, the flexible flow surface having a first shape when the second portion is in the first position, the flexible flow surface having a second shape different than the first shape when the second portion is in the second position; and a guide structure coupled between the first portion and the second portion.

4. The airfoil of claim 1, further comprising an actuator coupled to the guide structure to move the first portion relative to the second portion.

5. The airfoil of claim 3 wherein the second portion has a third flow surface opposite the flexible flow surface, and wherein the second portion has a thickness proximate to an interface between the flexible flow surface and the first portion, further wherein a ratio of the thickness to an overall length of the second portion has a value of from about 0.16 to about 0.25.

6. An airfoil, comprising:

a first portion having a first flow surface and a second flow surface facing opposite from the first flow surface;

a second portion having a leading edge, at least part of the second portion being positioned forward of the first portion, the second portion being movable relative to the first portion between a first position and a second position with the second position offset from the first position by an angle of about 45 degrees or more, wherein the second portion includes a flexible flow surface, the flexible flow surface having a first shape when the second portion is in the first position, the flexible flow surface having a second shape different than the first shape when the second portion is in the second position and wherein the second portion includes a leading edge body and a third flow surface opposite the flexible flow surface; and a guide structure coupled between the first portion and the second portion, the guide structure including:

a crank pivotably coupled to the first portion;

a link body pivotably coupled between the crank and the leading edge body;

a first link pivotably coupled between the first portion and the link body;

a second link pivotably coupled between the crank and the flexible flow surface;

a third link pivotably coupled between the crank and the third flow surface;

a fourth link coupled between the link body and the leading edge body; and a fifth link pivotably coupled between the link body and the leading edge body.

7. An airfoil, comprising:

a first portion having a first flow surface and a second flow surface facing opposite from the first flow surface, the second flow surface of the first portion including aft segment;

a second portion that includes a leading edge body having a leading edge, a forward segment pivotably coupled to the leading edge body, and an intermediate segment pivotably coupled to the aft segment and slideably engaged with the forward segment, at least part of the second portion being positioned forward of the first portion, the second portion being movable relative to the first portion between a first position and a second position with the second position offset from the first position by an angle of about 45 degrees or more, wherein the second portion includes a flexible flow surface, the flexible flow surface having a first shape when the second portion is in the first position, the flexible flow surface having a second shape different than the first shape when the second portion is in the second position; and a guide structure coupled between the first portion and the second portion.

8. An airfoil, comprising:

a first portion having a first flow surface and a second flow surface facing opposite from the first flow surface;

a second portion that includes a leading edge body having a leading edge, at least part of the second portion being positioned forward of the first portion, the second portion being movable relative to the first portion between a first position and a second position with the second position offset from the first position by an angle of about 45 degrees or more, wherein the second portion includes a flexible flow surface, the flexible flow surface having a first shape when the second portion is in the first position, the flexible flow surface having a second shave different than the first shape when the second portion is in the second position, the second portion further including a third flow surface opposite the flexible flow surface; and a guide structure coupled between the first portion and the second portion wherein the guide structure includes:
a crank pivotably coupled to the first portion;
a slider pivotably coupled to the crank and slideably engaged with the leading edge body;
a first link pivotably coupled between the first portion and the slider;
a second link pivotably coupled between the crank and the flexible flow surface; and
a third link pivotably coupled between the crank and the third flow surface.

9. An airfoil, comprising:

a first portion having a first flow surface and a second flow surface facing opposite from the first flow surface;

a second portion having a leading edge, at least part of the second portion being positioned forward of the first portion, the second portion being movable relative to the first portion between a first position and a second position, wherein the second portion includes a flexible flow surface and a third flow surface opposite the flexible flow surface, the flexible flow surface having a first shape when the second portion is in the first position, the flexible flow surface having a second shape different than the first shape when the second portion is in the second position; and a guide structure coupled between the first portion and the second portion, wherein the guide structure includes:
a crank pivotably coupled to the first portion;
a slider pivotably coupled to the crank and slideably engaged with the second portion;
a first link pivotably coupled between the first portion and the slider;
a second link pivotably coupled between the crank and the flexible flow surface; and
a third link pivotably coupled between the crank and the third flow surface.

10. The airfoil of claim 9 wherein with the second position is offset from the first position by an angle of about 45 degrees or more.

11. The airfoil of claim 9 wherein the second position is offset from the first position by an angle of about 90 degrees or more.

12. The airfoil of claim 9 wherein the guide structure is an outboard guide structure, the flexible flow surface is an outboard flexible flow surface, the leading edge is an outboard leading edge, and wherein the assembly further comprises:

a third portion having an inboard leading edge, at least part of the third portion being positioned forward of the first portion and inboard of the second portion, the third portion being movable relative to the first portion between a third position and a fourth position, wherein the third portion includes an inboard flexible flow surface and a fourth flow surface opposite the inboard flexible flow surface, the inboard flexible flow surface having a third shape when the third portion is in the third position, the inboard flexible flow surface having a fourth shape different than the third shape when the third portion is in the fourth position; and an inboard guide structure coupled between the first portion and the third portion, wherein a mechanical arrangement of the inboard guide structure is different than a mechanical arrangement of the outboard guide structure.

13. The airfoil of claim 9 wherein the guide structure is an outboard guide structure, the flexible flow surface is an outboard flexible flow surface, the leading edge is an outboard leading edge, and wherein the assembly further comprises:

a third portion having an inboard leading edge, at least part of the third portion being positioned forward of the first portion and inboard of the second portion, the third portion being movable relative to the first portion between a third position and a fourth position, wherein the third portion includes an inboard flexible flow surface and a fourth flow surface opposite the inboard flexible flow surface, the inboard flexible flow surface having a third shape when the third portion is in the third position, the inboard flexible flow surface having a fourth shape different than the third shape when the third portion is in the fourth position; and an inboard guide structure coupled between the first portion and the third portion, the inboard guide structure including:
a crank pivotably coupled to the first portion;
a link body pivotably coupled between the crank and the leading edge body;
a first link pivotably coupled between the first portion and the link body;
a second link pivotably coupled between the crank and the flexible flow surface;
a third link pivotably coupled between the crank and the third flow surface;
a fourth link coupled between the link body and the leading edge body; and
a fifth link pivotably coupled between the link body and the leading edge body.

14. An airfoil, comprising:

a first portion having a first flow surface and a second flow surface facing opposite from the first flow surface;

a second portion having a leading edge, at least part of the second portion being positioned forward of the first portion, the second portion being movable relative to the first portion between a first position and a second position, wherein the second portion includes a flexible flow surface and a third flow surface opposite the flexible flow surface, the flexible flow surface having a first shape when the second portion is in the first position, the flexible flow surface having a second shape different than the first shape when the second portion is in the second position; and a guide structure coupled between the first portion and the second portion, wherein the guide structure includes:
  a crank pivotably coupled to the first portion;
  a link body pivotably coupled between the crank and the second portion;
  a first link pivotably coupled between the first portion and the link body;
  a second link pivotably coupled between the crank and the flexible flow surface;
  a third link pivotably coupled between the crank and the lower flow surface;
  a fourth link coupled between the link body and the second portion; and
  a fifth link pivotably coupled between the link body and the second portion.

15. The airfoil of claim 14 wherein with the second position is offset from the first position by an angle of about 45 degrees or more.

16. The airfoil of claim 14 wherein the second position is offset from the first position by an angle of about 90 degrees or more.

17. The airfoil of claim 14 wherein the guide structure is an inboard guide structure, the flexible flow surface is an inboard flexible flow surface, the leading edge is an inboard leading edge, and wherein the assembly further comprises:
  a third portion having an outboard leading edge, at least part of the third portion being positioned forward of the first portion and outboard of the second portion, the third portion being movable relative to the first portion between a third position and a fourth position, wherein the third portion includes an outboard flexible flow surface and a fourth flow surface opposite the outboard flexible flow surface, the outboard flexible flow surface having a third shape when the third portion is in the third position, the outboard flexible flow surface having a fourth shape different than the third shape when the third portion is in the fourth position; and
  an outboard guide structure coupled between the first portion and the third portion, wherein a mechanical arrangement of the outboard guide structure is different than a mechanical arrangement of the inboard guide structure.

18. The airfoil of claim 14 wherein the guide structure is an inboard guide structure, the flexible flow surface is an inboard flexible flow surface, the leading edge is an inboard leading edge, and wherein the assembly further comprises:
  a third portion having an outboard leading edge, at least part of the third portion being positioned forward of the first portion and outboard of the second portion, the third portion being movable relative to the first portion between a third position and a fourth position, wherein the third portion includes an outboard flexible flow surface and a fourth flow surface opposite the outboard flexible flow surface, the outboard flexible flow surface having a third shape when the third portion is in the third position, the outboard flexible flow surface having a fourth shape different than the third shape when the third portion is in the fourth position; and
  an outboard guide structure coupled between the first portion and the third portion, the outboard guide structure including:
    a crank pivotably coupled to the first portion;
    a slider pivotably coupled to the crank and slideably engaged with the second portion;
    a first link pivotably coupled between the first portion and the slider;
    a second link pivotably coupled between the crank and the flexible flow surface; and
    a third link pivotably coupled between the crank and the third flow surface.

19. An airfoil, comprising:
  a first portion having a first flow surface and a second flow surface facing opposite from the first flow surface;
  a second portion having an inboard leading edge, at least part of the second portion being positioned forward of the first portion, the second portion being movable relative to the first portion between a first position and a second position, wherein the second portion includes an inboard flexible flow surface, the inboard flexible flow surface having a first shape when the second portion is in the first position, the inboard flexible flow surface having a second shape different than the first shape when the second portion is in the second position;
  an inboard guide structure coupled between the first portion and the second portion, the inboard guide structure having an inboard mechanical arrangement;
  a third portion having an outboard leading edge, at least part of the third portion being positioned forward of the first portion and outboard of the second portion, the third portion being movable relative to the first portion between a third position and a fourth position, wherein the third portion includes an outboard flexible flow surface, the outboard flexible flow surface having a third shape when the third portion is in the third position, the outboard flexible flow surface having a fourth shape different than the third shape when the third portion is in the fourth position; and
  an outboard guide structure coupled between the first portion and the third portion, the outboard guide structure having an outboard mechanical arrangement different than the inboard mechanical arrangement.

20. The airfoil of claim 19 wherein the third portion includes a third flow surface opposite the outboard flexible flow surface, and wherein the outboard guide structure includes:
  a crank pivotably coupled to the first portion;
  a slider pivotably coupled to the crank and slideably engaged with the third portion;
  a first link pivotably coupled between the first portion and the slider;
  a second link pivotably coupled between the crank and the outboard flexible flow surface; and
  a third link pivotably coupled between the crank and the third flow surface.

21. The airfoil of claim 19 wherein the second portion includes a third flow surface opposite the inboard flexible flow surface, and wherein the inboard guide structure includes:
  a crank pivotably coupled to the first portion;
  a link body pivotably coupled between the crank and the second portion;
  a first link pivotably coupled between the first portion and the link body;
  a second link pivotably coupled between the crank and the inboard flexible flow surface;

a third link pivotably coupled between the crank and the third flow surface;

a fourth link coupled between the link body and the second portion; and a fifth link pivotably coupled between the link body and the second portion.

22. The airfoil of claim 19 wherein the second position of at least one of the second and third portions is angularly offset from the first position of the at least one portion by at about 45 degrees or more.

23. The airfoil of claim 19 wherein the second position of at least one of the second and third positions is angularly offset from the first position of the at least one portion by about 90 degrees or more.

24. An airfoil, comprising:

first airfoil means for directing airflow, the first airflow means having a first flow surface and a second flow surface opposite the first flow surface;

second airfoil means for directing airflow, the second airfoil means being movably coupled to the first airfoil means, at least a portion of the second airfoil means being positioned forward of the first airfoil means, the second airfoil means having an inboard flow flexible surface;

third airfoil means for directing airflow, the third airfoil means being movably coupled to the first airfoil means outboard of the second airfoil means, at least a portion of the third airfoil means being positioned forward of the first airfoil means, the third airfoil means having an outboard flexible flow surface;

inboard guide means for deploying the second airfoil means, the inboard guide means being coupled between the first airfoil means and the second airfoil means, the inboard guide means having a first arrangement; and outboard guide means for deploying the third airfoil, the outboard guide means being coupled between the first airfoil means and the third airfoil means, the outboard guide means having a second arrangement mechanically non-similar to the first arrangement.

25. The airfoil of claim 24 wherein the outboard guide means include:

crank means for pivoting the first airfoil means;

slider means for slideably engaging the third airfoil means;

first link means for pivotably coupling the first airfoil means and the slider means;

second link means for pivotably coupling the crank means and the inboard flexible flow surface; and third link means for pivotably coupling the crank means and second airfoil means.

26. The airfoil of claim 24 wherein the inboard guide means include:

crank means for pivoting the first airfoil means;

link body means for pivotably coupling the crank means and the second airfoil means;

first link means for pivotably coupling the first airfoil means and the link body means;

second link means for pivotably coupling the crank means and the inboard flexible flow surface;

third link means for pivotably coupling the crank means and the second airfoil means;

fourth link means for coupling the link body means and the second airfoil means and fifth link means for pivotably coupling between the link body means and the second airfoil means.

27. The airfoil of claim 24 wherein at least one of the second and third airfoil means is deployable through an angle of about 45 degrees or more relative to the first airfoil means.

28. The airfoil of claim 24 wherein at least one of the second and third airfoil means is deployable through an angle of about 90 degrees or more relative to the first airfoil means.

29. An airfoil, comprising:

a first portion having a first flow surface and a second flow surface facing opposite from the first flow surface;

a second portion having an inboard leading edge, at least part of the second portion being positioned forward of the first portion, the second portion being movable relative to the first portion between a first position and a second position, wherein the second portion includes an inboard flexible flow surface, the inboard flexible flow surface having a first shape when the second portion is in the first position, the inboard flexible flow surface having a second shape different than the first shape when the second portion is in the second position;

an inboard guide structure hingedly coupled between the first portion and the second portion a third portion having an outboard leading edge, at least part of the third portion being positioned forward of the first portion and outboard of the second portion, the third portion being movable relative to the first portion between a third position and a fourth position, wherein the third portion includes an outboard flexible flow surface, the outboard flexible flow surface having a third shape when the third portion is in the third position, the outboard flexible flow surface having a fourth shape different than the third shape when the third portion is in the fourth position; and an outboard guide structure pivotably coupled to the first portion and slideably coupled to the third portion, the outboard guide structure being mechanically non-similar to the inboard guide structure.

30. The airfoil of claim 29 wherein the inboard guide structure includes:

an inboard crank pivotably coupled to the first portion;

a link body pivotably coupled between the inboard crank and the second portion;

an inboard first link pivotably coupled between the first portion and the link body;

an inboard second link pivotably coupled between the inboard crank and the inboard flexible flow surface;

an inboard third link pivotably coupled between the inboard crank and the second portion;

a fourth link coupled between the link body and the second portion; and a fifth link pivotably coupled between the link body and the second portion.

31. The airfoil of claim 29 wherein the outboard guide structure includes:

an outboard crank pivotably coupled to the first portion;

a slider pivotably coupled to the outboard crank and slideably engaged with the third portion;

an outboard first link pivotably coupled between the first portion and the slider;

an outboard second link pivotably coupled between the outboard crank and the outboard flexible flow surface; and an outboard third link pivotably coupled between the outboard crank and the third portion.

32. An aircraft, comprising:
a fuselage;
an airfoil depending from the fuselage, the airfoil including:
  a first portion having a first flow surface and a second flow surface facing opposite from the first flow surface;
  a second portion having a leading edge body with leading edge, at least part of the second portion being positioned forward of the first portion, the second portion being movable relative to the first portion between a first position and a second position with the second position offset from the first position by an angle of about 45 degrees or more, wherein the second portion includes a flexible flow surface, the flexible flow surface having a first shape when the second portion is in the first position, the flexible flow surface having a second shave different than the first shape when the second portion is in the second position, the second portion further having a third flow surface opposite the flexible flow surface; and
  a guide structure coupled between the first portion and the second portion the guide structure including:
    a crank pivotably coupled to the first portion;
    a link body pivotably coupled between the crank and the leading edge body;
    a first link pivotably coupled between the first portion and the link body;
    a second link pivotably coupled between the crank and the flexible flow surface;
    a third link pivotably coupled between the crank and the third flow surface;
    a fourth link coupled between the link body and the leading edge body; and
    a fifth link pivotably coupled between the link body and the leading edge body.

33. An aircraft, comprising:
a fuselage;
an airfoil depending from the fuselage, the airfoil including:
  a first portion having a first flow surface and a second flow surface facing opposite from the first flow surface;
  a second portion having a leading edge, at least cart of the second portion being positioned forward of the first portion, the second portion being movable relative to the first portion between a first position and a second position with the second position offset from the first position by an angle of about 90 degrees or more, wherein the second portion includes a flexible flow surface, the flexible flow surface having a first shape when the second portion is in the first position, the flexible flow surface having a second shape different than the first shape when the second portion is in the second position; and
  a guide structure coupled between the first portion and the second portion.

34. The aircraft of claim 33, further comprising an actuator coupled to the guide structure to move the first portion relative to the second portion.

35. The aircraft of claim 33 wherein the second portion has a third flow surface opposite the flexible flow surface, and wherein the second portion has a thickness proximate to an interface between the flexible flow surface and the first portion, further wherein a ratio of the thickness to an overall length of the second portion has a value of from about 0.16 to about 0.25.

36. An aircraft, comprising:
a fuselage;
an airfoil depending from the fuselage, the airfoil including:
  a first portion having a first flow surface and a second flow surface facing opposite from the first flow surface, the second flow surface of the first portion including an aft segment;
  a second portion that includes a leading edge body having a leading edge, a forward segment pivotably coupled to the leading edge body, and an intermediate segment pivotably coupled to the aft segment and slideably engaged with the forward segment, at least part of the second portion being positioned forward of the first portion, the second portion being movable relative to the first portion between a first position and a second position with the second position offset from the first position by an angle of about 45 degrees or more, wherein the second portion includes a flexible flow surface, the flexible flow surface having a first shape when the second portion is in the first position, the flexible flow surface having a second shape different than the first shape when the second portion is in the second position; and
a guide structure coupled between the first portion and the second portion.

37. An aircraft, comprising:
a fuselage;
an airfoil depending from the fuselage, the airfoil including:
  a first portion having a first flow surface and a second flow surface facing opposite from the first flow surface;
  a second portion having an inboard leading edge, at least part of the second portion being positioned forward of the first portion, the second portion being movable relative to the first portion between a first position and a second position, wherein the second portion includes an inboard flexible flow surface, the inboard flexible flow surface having a first shape when the second portion is in the first position, the inboard flexible flow surface having a second shape different than the first shape when the second portion is in the second position;
  an inboard guide structure coupled between the first portion and the second portion, the inboard guide structure having an inboard mechanical arrangement
  a third portion having an outboard leading edge, at least part of the third portion being positioned forward of the first portion and outboard of the second portion, the third portion being movable relative to the first portion between a third position and a fourth position, wherein the third portion includes an outboard flexible flow surface, the outboard flexible flow surface having a third shape when the third portion is in the third position, the outboard flexible flow surface having a fourth shape different than the third shape when the third portion is in the fourth position;
  an outboard guide structure coupled between the first portion and the third portion, the outboard guide structure having an outboard mechanical arrangement mechanically non-similar to the inboard mechanical arrangement.

38. The aircraft of claim 37 wherein the outboard guide structure includes:

a crank pivotably coupled to the first portion;
a slider pivotably coupled to the crank and slideably engaged with the third portion;
a first link pivotably coupled between the first portion and the slider;
a second link pivotably coupled between the crank and the outboard flexible flow surface; and
a third link pivotably coupled between the crank and the third portion.

39. The aircraft of claim 37 wherein the inboard guide structure includes:
a crank pivotably coupled to the first portion;
a link body pivotably coupled between the crank and the second portion;
a first link pivotably coupled between the first portion and the link body;
a second link pivotably coupled between the crank and the inboard flexible flow surface;
a third link pivotably coupled between the crank and the second portion;
a fourth link coupled between the link body and the second portion; and
a fifth link pivotably coupled between the link body and the second portion.

40. The aircraft of claim 37 wherein the second position of at least one of the second and third portions is angularly offset from the first position of the at least one portion by about 90 degrees or more.

41. A method for operating an aircraft airfoil having a first portion and a second portion movably coupled to the first portion, the method comprising:
moving the second portion of the airfoil relative to the first portion of the airfoil from a first position to a second position, with at least part of the second portion being positioned forward of the first portion, and with the second portion being deflected through an angle of about 90 degrees or more between the first position and the second position; and
changing a shape of a flexible flow surface of the second portion from a first shape to a second shape different than the first shape as the second portion moves from the first position to the second position.

42. The method of claim 41 wherein moving the second portion includes moving the second portion downwardly relative to the first portion.

43. A method for operating an aircraft airfoil having a first portion and a second portion movably coupled to the first portion, the method comprising:
moving the second portion of the airfoil relative to the first portion of the airfoil from a first position to a second position, with at least part of the second portion being positioned forward of the first portion, and with the second portion being deflected downwardly relative to the first portion through at least 45 degrees between the first position and the second position; and
changing a shape of a flexible flow surface of the second portion from a first shape to a second shape different than the first shape as the second portion moves from the first position to the second position; and moving the second portion upwardly relative to the first portion.

44. The method of claim 41, wherein the airfoil has a third portion movably coupled to the first portion outboard of the second portion, and wherein the method further comprises:
moving the second portion of the airfoil relative to the first portion of the airfoil by actuating a first guide structure having a first mechanical arrangement; and moving the third portion of the airfoil relative to the first portion of the airfoil by actuating a second guide structure having a second mechanical arrangement different than the first mechanical arrangement.

45. A method for operating an aircraft airfoil having a first portion and a second portion movably coupled to the first portion, the second portion including a leading edge body, the method comprising:
moving the second portion of the airfoil relative to the first portion of the airfoil from a first position to a second position, with at least cart of the second portion being positioned forward of the first portion, and with the second portion being deflected through at least 45 degrees between the first position and the second position, and wherein moving the second portion relative to the first portion includes:
rotating a crank pivotably coupled to the first portion;
translating a slider pivotably coupled to the crank and slideably engaged with the leading edge body;
rotating a first link pivotably coupled between the first portion and the slider;
rotating a second link pivotably coupled between the crank and the flexible flow surface;
rotating a third link pivotably coupled between the crank and the second portion; and
changing a shape of a flexible flow surface of the second portion from a first shape to a second shape different than the first shape as the second portion moves from the first position to the second position.

46. A method for operating an aircraft airfoil having a first portion and a second portion movably coupled to the first portion, the second portion including a leading edge body, the method comprising moving the second portion of the airfoil relative to the first portion of the airfoil from a first position to a second position, with at least part of the second portion being positioned forward of the first portion, and with the second portion being deflected through at least 45 degrees between the first position and the second position, wherein moving the second portion includes:
pivoting a crank relative to the first portion;
pivoting a link body pivotably coupled between the crank and the leading edge body;
rotating a first link pivotably coupled between the first portion and the link body;
rotating a second link pivotably coupled between the crank and the flexible flow surface;
pivoting a third link pivotably coupled between the crank and the second portion;
pivoting a fourth link coupled between the link body and the leading edge body;
rotating a fifth link pivotably coupled between the link body and the leading edge body; and
changing a shape of a flexible flow surface of the second portion from a first shape to a second shape different than the first shape as the second portion moves from the first position to the second position.

47. A method for operating an aircraft airfoil, the airfoil having a first portion, a second portion movably coupled to the first portion and a third portion movably coupled to the first portion outboard of the second portion, the method comprising:
moving the second portion of the airfoil relative to the first portion of the airfoil by actuating a first guide structure having a first mechanical arrangement; and
moving the third portion of the airfoil relative to the first portion of the airfoil by actuating a second guide structure having a second mechanical arrangement mechanically non-similar to the first mechanical arrangement.

48. The method of claim 47 wherein the second portion includes a leading edge body and a flexible flow surface, and wherein moving the second portion includes:

pivoting a crank relative to the first portion;

pivoting a link body pivotably coupled between the crank and the leading edge body;

rotating a first link pivotably coupled between the first portion and the link body;

rotating a second link pivotably coupled between the crank and the flexible flow surface;

pivoting a third link pivotably coupled between the crank and the second portion;

pivoting a fourth link coupled between the link body and the leading edge body; and rotating a fifth link pivotably coupled between the link body and the leading edge body.

49. The method of claim 47 wherein the third portion includes a leading edge body and a flexible flow surface, and wherein moving the third portion includes:

rotating a crank pivotably coupled to the first portion;

translating a slider pivotably coupled to the crank and slideably engaged with the leading edge body;

rotating a first link pivotably coupled between the first portion and the slider;

rotating a second link pivotably coupled between the crank and the flexible flow surface; and rotating a third link pivotably coupled between the crank and the third portion.

50. The method of claim 47 wherein moving the second portion of the airfoil includes moving the second portion through an angle of at least 45 degrees between a stowed position and a deployed position.

51. The method of claim 47 wherein moving the second portion of the airfoil includes moving the second portion through an angle of about 90 degrees or more between a stowed position and a deployed position.

52. The method of claim 47 wherein moving the second portion and moving the third portion includes moving the second and third portions through approximately the same angular deflection.

* * * * *

UNITED STATES PATENT AND TRADEMARK OFFICE
CERTIFICATE OF CORRECTION

PATENT NO. : 6,796,534 B2
DATED : September 28, 2004
INVENTOR(S) : Kevin W. Beyer et al.

It is certified that error appears in the above-identified patent and that said Letters Patent is hereby corrected as shown below:

Column 9,
Line 24, "shave" should be -- shape --;

Column 15,
Line 19, "shave" should be -- shape --;
Line 44, "cart" should be -- part --;

Column 18,
Line 11, "cart" should be -- part --;

Signed and Sealed this

Twenty-fourth Day of May, 2005

JON W. DUDAS
*Director of the United States Patent and Trademark Office*